(12) United States Patent
Lin

(10) Patent No.: US 8,729,157 B2
(45) Date of Patent: May 20, 2014

(54) ULTRA-HIGH SOLIDS EMULSION PRESSURE SENSITIVE ADHESIVES AND THEIR APPLICATIONS

(76) Inventor: Kenneth Lin, San Marino, CA (US)

( * ) Notice: Subject to any disclaimer, the term of this patent is extended or adjusted under 35 U.S.C. 154(b) by 859 days.

(21) Appl. No.: 12/798,006

(22) Filed: Mar. 29, 2010

(65) Prior Publication Data

US 2011/0236573 A1   Sep. 29, 2011

(51) Int. Cl.
*C08C 1/14* (2006.01)
*C08J 3/00* (2006.01)

(52) U.S. Cl.
CPC ..... *C08C 1/14* (2013.01); *C08J 3/00* (2013.01)
USPC ............................. 523/336; 523/335; 524/501

(58) Field of Classification Search
CPC ..................................... C08C 1/14; C08J 3/00
USPC ................................... 523/336, 335; 524/501
See application file for complete search history.

(56) References Cited

U.S. PATENT DOCUMENTS 3,622,127 A * 11/1971 Burke, Jr. ...................... 366/148

FOREIGN PATENT DOCUMENTS

GB          2054628 A   *   2/1981

* cited by examiner

*Primary Examiner* — Kelechi Egwim
(74) *Attorney, Agent, or Firm* — Jay R Akhave

(57) ABSTRACT

A process for making an ultra high solids emulsion adhesive that is coatable and dryable at room temperature. The process consists of increasing solids using a phase inversion process to accomplish the addition of increased solids into aqueous formulations thereby obtaining emulsion pressure sensitive adhesives with solids content in excess of 60%.

3 Claims, No Drawings

ULTRA-HIGH SOLIDS EMULSION PRESSURE SENSITIVE ADHESIVES AND THEIR APPLICATIONS

CROSS REFERENCE TO RELATED APPLICATIONS

None.

BACKGROUND OF THE INVENTION (1) Field of Invention

The present invention relates to the formulation and manufacture of an emulsion adhesive with a solids content greater than 60% solids that is easily coatable or spreadable on substrates and exhibits excellent stability upon aging. The present invention teaches a method to increase the solids content of an existing emulsion by forming solid particles within the water phase of an existing emulsion so as to create multimodal solids distribution of particles thereby significantly increasing the packing density and thereby the solids content of the resulting emulsion with a special inversion process. The present invention in particular relates to a method of making and using such stable water based emulsion adhesives to avoid paper substrate wrinkling. The present invention also in particular relates to the avoidance or a drastic reduction of the water drying step in the manufacture of coatings from such inventive high solids emulsion adhesives.

(2) Description of Related Art

The upper limit of solids content of water based emulsion adhesives is generally about 60% as it very difficult to make any higher solids by present methods. At this solids level, emulsion adhesives still have a significant amount of water in them. As a result one has to be careful in directly coating such adhesives onto paper where the water may be absorbed and cause the paper substrate to curl and deform.

The presence of large amount of water in typical emulsions does not allow direct coating of emulsions onto a paper substrate without wrinkling the paper. As a result, transfer coating methodology is usually used to coat a water-based pressure sensitive adhesive onto a paper substrate. The adhesives are first coated directly onto a transfer film or silicone coated paper where the absorption of water is kept to a minimum. The adhesive is then dried. The adhesive coating is then transferred to a paper substrate where the paper now sees a much lesser water content and is thus not subjected to any water absorption and subsequent curling. The intermediate transfer substrate is typically a silicone coated paper or film and is usually a wasted by-product. There is great utility in reducing the amount of water in emulsions, by making them higher solids, to reduce wrinkling of paper substrates when such adhesives are directly coated onto paper, thereby by-passing a transfer coating step.

Large amounts of energy are also typically needed to dry water based emulsion adhesives. Removal of water is an energy intensive process. It is useful to minimize the energy used in this drying step by reducing the water content and yet get good adhesion characteristics. Both the consumption of energy for drying and the spewing of dryer exhaust into the atmosphere are fundamentally environmentally unfriendly. As a result, there is great utility in creating water-based adhesives with solids content as high as possible.

There is an upper limit to the level of solids of a stable emulsion adhesive. The theoretical maximum packing ratio of solids in emulsion or suspensions in a liquid is around 63%. In general it is difficult for industrial emulsion adhesives to achieve such a high packing ratio. In practice solids content above 55% are usually obtained with a great deal of careful recipe engineering in the case of emulsions. In general, there has to be a very careful balance of surfactant level and the surfactant type in recipe design.

U.S. Pat. No. 4,687,594 teaches the design of such high solids polyvinyl acetate emulsions. While vinyl acetate emulsions are not pressure sensitive adhesives by themselves, they may be components of pressure sensitive emulsion adhesives, in combination with other materials like acrylics. Here they are discussed to show limits of level of solids in emulsions. Vinyl acetate copolymer emulsions having a solids content of 65% by weight are known and some are articles of commerce. Polyvinyl acetate emulsion has rigid non-tacky particles as inner phase and the coagulation tendency is not as severe as in a pressure sensitive adhesive emulsion which has a tacky inner phase. These emulsions, however, often require high levels of surfactant or protective colloid to achieve the required stability to shearing forces and to freezing. In addition, special techniques as delayed surfactant addition or the use of monomer pre-emulsions are often required in order to achieve manageable viscosities in production. These departures from conventional practice, while successfully producing 65% solids latexes, can lead to undesirable properties such as reduced resistance to moisture and unsatisfactory rheological properties. The variations from conventional procedures may also require equipment changes and result in a more expensive process. It is difficult to manage solids levels in emulsions beyond 65% solids and obtaining a cost effective stable and coatable emulsion adhesive. As a result, one very seldom sees in the market water based emulsions at greater than 65% solids.

U.S. Pat. No. 4,767,813 also teaches a way of forming high solids aqueous based pressure sensitive adhesives by directly emulsifying the tackifier into a water based emulsion by mechanically mixing an additional oil phase into the existing water phase of the base emulsion. This process and subsequent increase in level of solids is limited by the agitation means and the ability to breakdown the tackifier phase into smaller particles for incorporation into the continuous water phase of the emulsion. The mechanical breakdown and incorporation of tackifier into the water phase of the base emulsion will increase solids % but once again be limited in packing density and hence the overall solids content by the ability to break down the tackifier mechanically into small domains. A more innovative way to incorporate a tackifier into the emulsion mix is desirable.

The term 'ultra-high' solids denotes % solids level in water-based emulsions in excess of 60% solids. In fact, for the purposes of this invention the meaning of the term 'ultra-high solids' is a solids range from 60% to about 90%. In the art, U.S. Pat. No. 6,001,916 defines the same term to mean solids in excess of 65%, preferably greater than 70%.

High solids pressure sensitive adhesives present huge opportunities in the commercial world by reducing and eliminating, if solid are high enough, a production step of drying and the corresponding investment in drying equipment. Hence with such an adhesive one can easily apply an adhesive to select areas of a substrate in a printing machine without the need for ovens to subsequently dry the adhesive. Currently hot-melts can be printed in such a fashion, but no water-based adhesive are available to do this. Hot melt adhesive requires controlled heating equipment to melt the adhesive for coating and therefore is cumbersome to use. This adhesive is room temperature coatable and requires minimum heating to dry into a tacky film.

Emulsions obtained by the processes of prior art still have significant water content that needs a subsequent drying step to form good adhesive films. What is desired is a process to further increase the solids, while maintaining formulation stability, to the extent that the water content of the resultant adhesive is so low, preferably 70% solids or above, that one does not need a separate drying step to form adhesive films and at the same time there is no significant paper curl from moisture penetrating into a paper coated substrate.

In general there is always a utility for a water based emulsion adhesive with lower water content, i.e. a very high solids content, preferably above 60%, to reduce the energy consumption in drying of coated adhesive films. There is also a great need to have high solids emulsions that can be applied to most papers without causing significant wrinkling or curling of the paper and can be dried at room conditions with minimal heat and/or additional airflow.

BRIEF SUMMARY OF THE INVENTION

A higher solids ratio emulsion pressure sensitive adhesive is created by adding an emulsion polymer into an oil phase formulation. First, low volatility oil, a tackifying resin and an emulsifier are blended to form a low viscosity molten continuous oil phase. While mixing the oil phase, an emulsion polymer is slowly added to this continuous oil phase. A white thick emulsion is obtained at the end of the feed period. A water-in-oil emulsion is created at this point at which the inner water phase has smaller particles of oil phase in it. (One can call the system as oil-in water-in-oil suspension. If one were to use plain water in place of the emulsion, then it would simply be a water-in-oil emulsion).

As increasing amounts of the emulsion polymer are added to the mixture, there comes a point when the oil-in-water-in-oil suspension inverts into an oil-in-water suspension. This happens when the interfacial tension between the water and oil phase is very low. Now upon further addition of the water base emulsion, the mixture becomes an oil-in water emulsion and the molten tackifier is incorporated as separate particles into the water phase, along with the particles that existed in the initial emulsion.

The particle size of the added emulsion is selected to create a final emulsion that is multimodal in its particle size distribution so as to allow a much higher packing density in the resulting total emulsion product. In this case, the particle size of the distributed continuous oil phase and the particle size of the fed emulsion polymer are matched to create a bimodal distribution so as to provide better packing density of the solids. Such adhesives can reach solids levels in excess of 60% solids and result in stable coatable adhesives. We refer to such adhesives as having an ultra-high solids content. These ultrahigh solids adhesives can be as high as about 90% solids. In general, solids content beyond 90% may also be possible, but one has to balance the coatability of such emulsion adhesives with the coating process on hand.

Such higher packing density is achieved that is not easily possible with a water based adhesive made using conventional emulsion polymerization process and tackifier addition processes of the prior art mentioned above.

Another aspect of the invention is the ability to use such high solids adhesives made by this process without a formal drying step. These adhesives at sufficiently high solids can dry at room temperature without the need for special equipment for drying. This can mean huge cost savings both to the coating industry as well as to the applicator at the point of use.

Another aspect of this invention is to use this process to increase the solids content of low solids emulsion adhesives to a higher solids level.

Yet another aspect of this invention is that it produces a more environmentally friendly adhesive emulsion than the lower solids emulsions available in the market today that involves less drying and hence less heat usage and environmental pollution with dried vapor.

Yet another aspect of this invention is to create a coated, tacky hydrophilic adhesive that can be applied onto a damp surface, such as water-washed produce and damp food or drink bottles. After coating and before drying, this adhesive has a tacky hydrophilic surface and can absorb moisture and can adhere strongly to a damp or wet surface. Most tacky pressure sensitive adhesives are hydrophobic and have limited ability to adhere to wet surfaces.

DETAILED DESCRIPTION OF INVENTION

Ultra high solids emulsion adhesives are adhesives with solids content greater than 60%. There is a great need for having a simpler process to make higher solids emulsion on an industrial scale with a solids content above 60%.

An emulsion is a suspension with tiny droplets of one liquid in another liquid. Generically an emulsion is understood to have oil droplets in water. Oil is the discontinuous phase and water is the continuous phase. An inverted emulsion is an emulsion in which oil is the continuous or external phase and water is the internal phase.

Emulsion polymer processes typically use seeding methods to form higher polymer emulsions in the range of 59% to 63% solids. Multiple seeding methods make the emulsion unstable and sensitive to shear and as a result these processes are limited to a maximum of about 63% solids content for obtaining stable, coatable emulsions and are usually obtained with great difficulty.

Useful adhesive emulsions need to be easily coatable. Generally adhesive emulsions are applied to substrates under 200 grams per sq. meter. Various coating methods such as slot die, knife, and roll or, gravure-coating methods are employed in the coating of emulsions. A good measure of coatability of a pressure sensitive emulsion adhesive coating is its spreadability on a surface and its ability to dry into a uniform permanently tacky film. Generally for ease of coating for emulsions, coating viscosities are preferentially maintained between 1,000 and 8,000 cps at 25° C., preferably between 2,000 to 5,000 cps. We recognize that coating viscosities will rise as a result of increasing solids in our emulsion adhesives. When viscosities become higher than this range, other coating techniques can be brought into play like extrusion coating, die coating, slot die coating as needed. Typically one would characterize the viscosity versus shear rate of a formulation, select the shear rate range appropriate for the coating technique and then adjust viscosity for coatability.

Emulsion adhesives need to be stable. They need to be stable in storage and subsequent processing and application conditions. They need to be stable under the shear conditions of the coating process employed to coat them. A shelf life of 3 to 6 months at room temperature is usually an acceptable measure of stability for an emulsion.

Generally emulsions with a solids content of higher than 60% present issues in both the coatability and the stability areas.

In the present invention, a low volatility oil, a tackifying resin and an emulsifier are first blended to form a continuous oil phase. The low volatility oil preferably should have less than 5% volatile component, although this is not a limitation.

Less than 1% volatile would be strongly desirable. The oil could be napthenic or paraffinic. It should be compatible with the polymer used. In our examples, napthenic oil is used with an SBR (styrene butadiene rubber) latex. Without limiting, the tackifying resin can be any of the rosin esters or C5-C9 petroleum resins or terpene resins. Again the tackifying resin needs to be compatible with the polymer used. In our example a methyl ester of rosin acid is used. Without limiting, the emulsifier could be an anionic or non-ionic. It needs to be compatible with the polymer and the tackifying resin and oil used and needs to be an effective emulsifier. Rosin soap, sodium lauryl sulfate (SLS) are examples of anionic surfactants and Dow Chemical Co.'s Triton X-100 and Triton X-405 are examples of non-ionic surfactants that can be used.

This continuous oil phase made is blended at a higher temperature to form a low viscosity molten solution.

While stirring the continuous oil phase at the higher temperature a water based emulsion polymer is slowly added. Water based polymers suitable for this, without limiting, could be Styrene-butadiene-rubbers, various acrylic emulsions, natural rubber latex and other synthetic polymers. The mixture starts immediately as an oil-in-water-in-oil emulsion at this point, and upon the addition of adequate amounts of water-based emulsion an inversion takes place. At that point one once again has an oil-in-water suspension.

Phase inversion is the process in which the dispersion morphology of a system of two immiscible liquids spontaneously interchange under the influence of system properties, volume fraction and energy input. For example, phase inversion occurs when a water-in-oil dispersion inverts to become an oil-in-water dispersion and vice versa. This phenomenon occurs widely, whether desirably or undesirably, in industrial processes ranging from mixing and contacting equipment to pipeline flows. The prediction of the holdup at which phase inversion occurs is an important factor in the design of these systems After phase inversion, the continuous oil phase gets dispersed as typically about 1 micron particles in the water phase of the added emulsion. Upon cooling down of the mixture, the dispersed oil phase solidifies and form larger solid particles in the water phase of the added emulsion. The larger oil phase solid particles, which is typically 0.5 to 1 micron in diameter, and the smaller added emulsion particles, which is typically 0.1 micron in diameter, now form the bimodal distribution of particles in the resulting stable emulsion mixture with ultrahigh solid. The added emulsion can be an emulsion of up to 65% solids content.

Oil phase particles are typically at 0.5 to 1.0 micron diameter range while the polymer emulsion particles are typically in the tens to hundreds nanometers range. The particle size of the oil phase is controllable within a narrow range by the intensity of the mixing. This invention does not limit the particle size ranges used in the bimodal mixture nor does it limit the number of components that can be used to form such effectively packed systems. The use of multimodal packing schemes are also envisioned by this invention wherein one may use a combination of three different particle size distributions to get an improved packing density in the final adhesive product.

With the above method, a higher packing density well in excess of 60% solids is achieved within this mixture that is not easily possible with a water-based adhesive made using emulsion polymerization process.

Additionally, a very small particle size of the solid tackifier is achieved by inversion process that occurs in this invention. The inversion occurs when the interfacial tension goes to a minimum in the process. Getting such smaller particle sizes from any mechanical agitation means is very difficult. Fernandez P., et al. Colloids and Surfaces A: Physicochem. Eng. Aspects 251 (2004) on pg 58 also concludes just as we do that with a phase inversion process finely dispersed oil droplets can be achieved, which are much smaller than those obtained by mechanical emulsification solely. Also, the inversion process produces more stable suspensions due to the smaller particle size generated leading to overall emulsion stability.

The teachings of the present invention can be extended to increase the solids level of lower solids emulsion. This invention provided a simple, industrially feasible methodology of increasing the solids content of low solids emulsions to achieve higher solids. The present invention also suggests and motivates one to use this method for increasing the solids level of low solids emulsions.

The present invention is a smooth, coatable and stable emulsion.

The present invention does not cause significant wrinkling when coated directly onto papers.

Such stable coatable high solids emulsion adhesives as described in this invention have a variety of very useful applications described below.

Use of this inventive adhesive provides a convenient way to make low cost labels at application time with an applicator, on press or on a coater.

Direct coating of this adhesive onto substrates provides good anchorage without the need for a primer.

The present invention can be used as a fast drying no wrinkle paper glue. It performs more advantageously over glue sticks, and white Elmer's glue causing reduced wrinkling and a better adhesion.

People generally use contact cements (solvent-based adhesives) to avoid wrinkling paper, but then it has the hazards of exposure to solvents since contact cements contain a solvent. The inventive ultrahigh emulsion adhesives solids can be a good safe and environmentally friendly substitute for contact cements as a solvent free adhesive.

The present invention can be used to make linerless pressure sensitive labels that can be made at the point of use.

The present invention can also be coated on a release liner that can be re-used at the point of adhesive use resulting in the savings in the cost of replacement release liners. Traditionally, in the case of pressure sensitive labels, the release liner is thrown away and wasted after the use of the pressure sensitive labels.

The present invention does not need the same scale of drying as current emulsion adhesives and can be used in creating a more environmentally friendly energy saving labels and coatings.

The present invention of an ultrahigh solids emulsion adhesive can be applied to a substrate as a very thick coating that can be defect free as there is not much water to evaporate for drying of the thick film. The lesser evaporation eliminates significant defects in the thick dried film of adhesive. This eliminates multiple paths of coating and drying in thinner layers to get an overall thick layer.

The present adhesive invention can be used in a transfer glue patch application.

The present adhesive can be packaged into an application cartridge and used in an adhesive dispensing system.

The present adhesive invention can be based on SBRs (styrene butadiene rubbers), acrylics, natural rubber, or any synthetic polymer The present adhesive invention can be used to make permanent, removable and freezer grade formulations of adhesives.

The present invention can be used to label a damp or wet surface such as water-washed fruits and damp food or drink bottles.

As is shown above, this present invention can find multitudinous uses where the basic characteristic of ultra-high solids content adhesive can be an asset in both manufacturing and use. We do not intend limit the scope of uses for such inventive adhesives made by the inventive process by the generic uses mentioned in this description. This adhesive can function in all areas where adhesives are used including product application areas using hot-melts, warm melts, emulsion adhesives, water based adhesives.

The following examples are intended to illustrate the invention and are not intended to limit it.

Example 1

36.6 g of Eastman-Dresinate TX Rosin Soap was added to 165 g. of Ergon Refining-Hyprene L500 to form slurry in a container. Then 165 g. of Arakawa-Pensel GA-90F was added to the mixture. The contents of the container were heated to 200 degrees F. and stirred until a homogenous solution A was obtained.

In a separate container, 8.1 g. of Clariant-Genapol ID 060 was added to 441 g. of Mallard Creek-Rovene 6105 SBR Latex (50% solids) to form a uniform mixture B.

B was added slowly to A under high speed mixing while maintaining the temperature of the mixture at 200 degrees Fahrenheit.

In Run 1 we obtained a white thick emulsion with a blue tint and a measured solids of 76% with a theoretical solids of 73%. In Run 2 we obtained a light thick brown emulsion and a measured solids of 83% with theoretical solids of 80%. The difference in solids content in this example between the Runs 1 and 2 is explained by the additional water used in the preparation of Run 1. The differences between theoretical and measured solids in both runs are due to the evaporation losses because the experiment was done with open vessels.

Stable emulsions were obtained. Both the emulsions from Run 1 and 2 were coatable at room temperature on to paper without significantly wrinkling the paper.

The emulsion adhesives were non-toxic, room temperature coatable and very fast drying, and permanently tacky.

The high solids adhesives made by this example are very economically made and use standard readily available ingredients and equipment.

Example 2

Adhesive from Example 1 is coated onto a release-coated substrate so as to form a coating of the adhesive. The coating will dry easily at room temperature and formed a defect-free adhesive film due to its reduced water content.

A paper (facestock) cutout is laid onto the adhesive film and was removed thereby transferring the adhesive layer from the release-coated substrate to the paper cutout.

The adhesive coated (transfer coated) paper cutout was applied by hand to another substrate in a decorative application.

Such an easy method of glue application can be used in an arts and crafts application.

Note that one cannot do this with typical emulsion adhesives, as the adhesive films that are formed on a release paper are full of defects, fisheyes, etc due to a high water content in typical emulsions. One has also wait a long time for the typical emulsion adhesive to dry otherwise it would wrinkle the paper (facestock) cutout. Here there was no wrinkling of the paper cutout, as the water content of our adhesive film was very low.

Example 3

The emulsion adhesive of Example 1 was applied to a printer paper similar to one used in ink jet and laser printing. It dried very quickly to form a tacky surface ready for bonding to other surface and bonded without wrinkling the printer paper. In comparison, when glue stick adhesive and white glue available in the market was used on printed-paper, there was a significant amount of wrinkling of the paper. Additionally our adhesive coating had better green strength (tack) than the traditional glue stick coating and the construction did need to be held together until completion of drying like one needs to in the case of white glue. Moreover, the 'open' time for bonding to a substrate for the glue stick and the white glue adhesives was very limited compared to unlimited 'open' time for the permanently tacky adhesive of this example. 'Open' time is the time period wherein good bonding between the adhesive and the substrate can be made.

Example 4

36.6 g of Eastman-Dresinate TX Rosin Soap was added to 165 g. of Ergon Refining-Hyprene L500 to form slurry in a container. Then 165 g. of Arakawa-Pensel GA-90F was added to the mixture. The contents of the container were heated to 200 degrees F. and stirred until a homogenous solution A was obtained.

In a separate container, 8.1 g. of Clariant-Genapol ID 060 was added to 441 g. of Mallard Creek-Rovene 6105 SBR Latex (50% solids) to form a uniform mixture B.

B was added slowly to A under high speed mixing while maintaining the temperature of the mixture at 200 degrees Fahrenheit and a white thick emulsion with a blue tint was obtained.

441 g of Mallard Creek-Rovene 6019 SBR Latex (54% solids) was added to this emulsion to form a final adhesive. The Tg of Rovene 6019 is significantly higher than that of Rovene 6105. This final adhesive provides a very fast drying high strength adhesive that can be used to glued wood, leather, vinyl, papers and other household items with high adhesion strength.

The theoretical solids content of the resulting thick white emulsion was 66%. The measured solids was 69%. The white emulsion was stable and coatable at room temperature.

Example 5

A fruit label was made using adhesive of Example 1. The label was next applied to a wetted cantaloupe surface. The label stuck well to the fruit and had peel strengths of the magnitude such that the fruit could be supported upon peeling off part of the label. This is not achieve-able by other adhesives since the washed cantaloupe had a wet and very rough surface.

Example 6

Using a label stock that was sheeted and stacked, the adhesive of Example 1 was coated with a roller coater or a blade coater onto the label. Then the individual label was dispensed. The dispensed label was applied to substrate surface immediately. No additional drying was necessary.

Example 7

Adhesive of Example 1 was coated on a release-coated surface and then the coated adhesive was transferred to paper. The adhesive was reapplied on the release-coated surface and again transferred to another area of paper stock. This was repeated several times. This served to simulate a linerless application of this adhesive where the release surface was used repeatedly.

I claim:

1. A high solids oil-in-water emulsion adhesive wherein the solids content of the adhesive is greater than 70% made by a process comprising of:
   preparing a molten uniform oil phase formulation, comprising of a hydrophobic material and surfactants,
   slowly adding an oil-in-water water-based formulation to the said molten oil phase such that the added said oil-in-water water-based formulation forms an oil-in-water-in-oil emulsion while maintaining such a suspension by agitation,
   continue adding increasing quantity of the said oil-in-water water-based formulation to the said formed oil-in-water-in-oil suspension until the oil-in-water-in-oil suspension inverts to an oil-in-water suspension with both types of oil phase particles co-existing in the continuous water phase of the suspension,
   optionally adding additional amounts of the said oil-in-water water-based formulation to bring the % solids of the formed oil-in-water suspension to the solids level desired.

2. An adhesive of claim 1 wherein the solids content of the adhesive is in the range of 70% to 75%.

3. An adhesive of claim 1 wherein the solids content of the adhesive is in the range of 75% to 85%.

* * * * *